(12) United States Patent
Rimboeck et al.

(10) Patent No.: US 12,180,079 B2
(45) Date of Patent: *Dec. 31, 2024

(54) PROCESS FOR PREPARING CHLOROSILANES

(71) Applicant: Wacker Chemie AG, Munich (DE)

(72) Inventors: Karl-Heinz Rimboeck, Heldenstein (DE); Tassilo Freiherr von Aretin, Burghausen (DE); Johannes Sundberg, Burghausen (DE)

(73) Assignee: Wacker Chemie AG, Munich (DE)

( * ) Notice: Subject to any disclaimer, the term of this patent is extended or adjusted under 35 U.S.C. 154(b) by 739 days.

This patent is subject to a terminal disclaimer.

(21) Appl. No.: 17/309,785

(22) PCT Filed: Dec. 18, 2018

(86) PCT No.: PCT/EP2018/085443
§ 371 (c)(1),
(2) Date: Jun. 18, 2021

(87) PCT Pub. No.: WO2020/125944
PCT Pub. Date: Jun. 25, 2020

(65) Prior Publication Data
US 2022/0041455 A1  Feb. 10, 2022

(51) Int. Cl.
*C01B 33/107* (2006.01)
*B01J 8/24* (2006.01)

(52) U.S. Cl.
CPC ........... *C01B 33/10742* (2013.01); *B01J 8/24* (2013.01)

(58) Field of Classification Search
CPC ............ B01J 8/1809; B01J 2008/00017; B01J 2008/00539; B01J 2008/00548; B01J 2008/00575; B01J 2008/00584; B01J 2008/00672; B01J 2008/00796; C01B 33/10742

See application file for complete search history.

(56) References Cited

U.S. PATENT DOCUMENTS

| | | | |
|---|---|---|---|
| 4,092,446 | A | 5/1978 | Padovani et al. |
| 2004/0047793 | A1 | 3/2004 | Mleczko et al. |

FOREIGN PATENT DOCUMENTS

| | | |
|---|---|---|
| DE | 3938897 A1 | 6/1990 |
| DE | 19740923 A1 | 3/1998 |
| DE | 102008041974 A1 | 3/2010 |
| WO | 0248024 A2 | 6/2002 |

(Continued)

*Primary Examiner* — Richard M Rump

(57) ABSTRACT

The present disclosure relates to a process for producing chlorosilanes in a fluidized bed reactor by reacting a hydrogen chloride-containing reaction gas with a particulate contact mass containing silicon and optionally a catalyst. The chlorosilanes have the general formula $H_nSiCl_{4-n}$ and/or $H_mCl_{6-m}Si_2$. The reactor design is described by an index K1, the constitution of the contact mass without catalyst is described by an index $K2_{uncat}$, the constitution of the contact mass with catalyst is described by an index $K2_{cat}$, and the reaction conditions are described by an index K3.

17 Claims, 1 Drawing Sheet

(56) References Cited

FOREIGN PATENT DOCUMENTS

Figure 1:
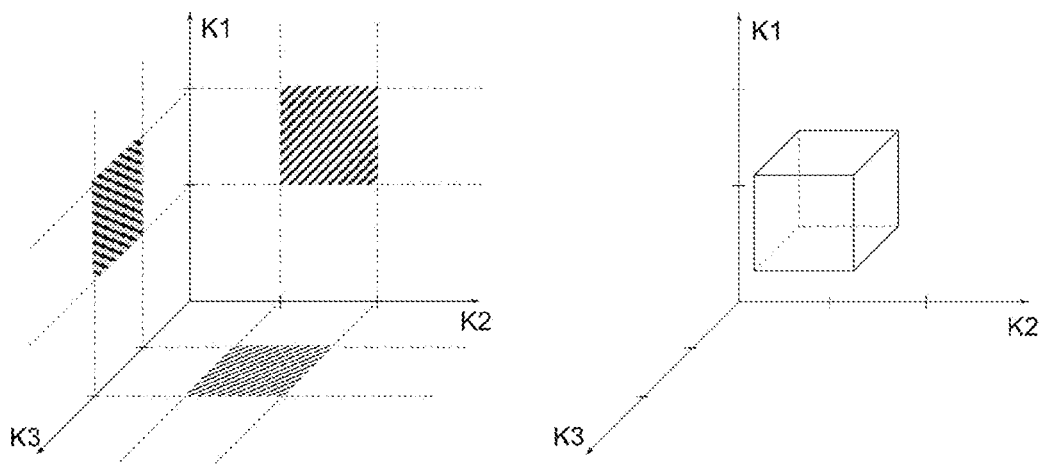

| WO | 10028878 A1 | 3/2010 | | |
|---|---|---|---|---|
| WO | WO-2011009390 A1 | * | 1/2011 | ........... C01B 33/027 |
| WO | 16198264 A1 | 12/2016 | | |

* cited by examiner

PROCESS FOR PREPARING CHLOROSILANES

CROSS-REFERENCE TO RELATED APPLICATIONS

This application is a U.S. National Phase application of PCT Application NO. PCT/EP2018/085443 filed on Dec. 18, 2018 the entire disclosure of which is incorporated by reference herein.

FIELD OF THE DISCLOSURE

The present disclosure relates to a process and method of preparing chlorosilanes.

The disclosure relates to a process for producing chlorosilanes in a fluidized bed reactor by reaction of a hydrogen chloride-containing reaction gas with a particulate contact mass containing silicon and optionally a catalyst, wherein the chlorosilanes have the general formula $H_nSiCl_{4-n}$ and/or $H_mCl_{6-m}Si_2$ where n=1 to 4 and m=0 to 4, characterized in that the reactor design is described by an index K1, the constitution of the contact mass without catalyst is described by an index $K2_{uncat}$, the constitution of the contact mass with catalyst is described by an index $K2_{cat}$, and the reaction conditions are described by an index K3, wherein K1 has a value of 1 to 10, $K2_{uncat}$ has a value of 0.1 to 10, $K2_{cat}$ has a value of 0.005 to 3 and K3 has a value of 1 to 700.

The production of polycrystalline silicon as a starting material for the manufacture of chips or solar cells is typically effected by decomposition of its volatile halogen compounds, in particular trichlorosilane (TCS, $HSiCl_3$).

Polycrystalline silicon (polysilicon) may be produced in the form of rods by the Siemens process, wherein polysilicon is deposited on heated filament rods in a reactor. A mixture of TCS and hydrogen is typically employed as process gas. Alternatively, polysilicon granulate may be produced in a fluidized bed reactor. This comprises fluidizing the silicon particles in a fluidized bed using a gas flow, wherein said fluidized bed is heated to high temperatures via a heating apparatus. Addition of a silicon-containing reaction gas such as TCS causes a pyrolysis reaction to take place at the hot particle surface, thus causing the particles to increase in diameter.

The production of chlorosilanes, in particular TCS, may be carried out essentially by three processes which are based on the following reactions (cf. WO2010/028878A1 and WO2016/198264A1):

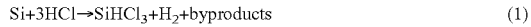

$$Si+3HCl \rightarrow SiHCl_3+H_2+byproducts \quad (1)$$

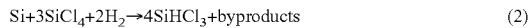

$$Si+3SiCl_4+2H_2 \rightarrow 4SiHCl_3+byproducts \quad (2)$$

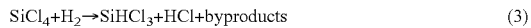

$$SiCl_4+H_2 \rightarrow SiHCl_3+HCl+byproducts \quad (3)$$

Byproducts generated may include further halosilanes, for example monochlorosilane ($H_3SiCl$), dichlorosilane ($H_2SiCl_2$), silicon tetrachloride (STC, $SiCl_4$) and di- and oligosilanes. Impurities such as hydrocarbons, organochlorosilanes and metal chlorides may also be constituents of the byproducts. Production of high-purity TCS therefore typically includes a subsequent distillation.

The hydrochlorination (HC) according to reaction (1) makes it possible to produce chlorosilanes from metallurgical silicon ($Si_{mg}$) by addition of hydrogen chloride (HCl) in a fluidized bed reactor, wherein the reaction proceeds exothermically. This generally affords TCS and STC as the main products.

A further option for producing chlorosilanes, in particular TCS, is the thermal conversion of STC and hydrogen in the gas phase in the presence or absence of a catalyst.

The low temperature conversion (LTC) according to reaction (2) is a weakly endothermic process and is typically performed in the presence of a catalyst (for example copper-containing catalysts or catalyst mixtures). The LTC may be carried out in a fluidized bed reactor in the presence of $Si_{mg}$ under high pressure (0.5 to 5 MPa) at temperatures between 400° C. and 700° C. An uncatalyzed reaction mode is possible using $Si_{mg}$ and/or by addition of HCl to the reaction gas. However, other product distributions may result and/or lower TCS selectivities may be achieved than in the catalyzed variant.

The high temperature conversion according to reaction (3) is an endothermic process. This process is typically carried out in a reactor under high pressure at temperatures between 600° C. and 1200° C.

The known processes are in principle costly and energy intensive. The required energy input which is generally effected by an electric device represents a significant cost factor. The operative performance (expressed for example by the TCS selectivity-weighted productivity, the formation of little in the way of high-boiling byproducts) of the HC in the fluidized bed reactor depends decisively on the adjustable reaction parameters. A continuous process mode further requires that the reaction components silicon and HCl are introduced into the reactor under the reaction conditions and this is associated with considerable technical complexity. Against this backdrop it is important to realize the highest possible productivity (amount of chlorosilanes formed per unit time and reaction volume) and the highest possible selectivity based on the desired target product (typically TCS) (TCS selectivity-weighted productivity).

The production of chlorosilanes by HC is a highly dynamic process. For the most efficient possible performance and constant optimization of the HC it is necessary to understand and visualize the underlying dynamics. This generally requires methods having a high temporal resolution for process monitoring.

It is known to determine the composition in a product mixture from HC in a personnel-intensive laboratory method by analysis of withdrawn samples (off-/at-line measurement). However, said analysis always takes place with a time delay and thus in the best case provides a point-like, retrospective extract of a discrete operating state of a fluidized bed reactor. However, if for example product gas streams of a plurality of reactors are combined in one condensation sector and only one sample of this condensate mixture is withdrawn it is not possible to draw concrete conclusions about the operating conditions of the individual reactors on the basis of the analytical results.

In order to be able to measure the composition of a product mixture from HC in high temporal resolution it is possible to employ (preferably at each individual reactor) process analyzers in the gas and/or condensate stream, for example process gas chromatographs (on-/in-line and/or noninvasive measurement). However, in principle the disadvantage of this is the limited number of employable instruments due to the high mechanical stress (abrasion) and the aggressive chemical environment. The generally high capital and maintenance costs are a further cost factor.

In order to identify discrete operating states of HC reactors it is possible in principle to make use of various process analytical methods which may be categorized as follows (W.-D. Hergeth, On-Line Monitoring of Chemical Reactions: Ullmann's Encyclopedia of Industrial Chemistry, Wiley: Weinheim, Germany 2006).

| Category | Sampling | Sample transport | Analysis |
|---|---|---|---|
| off-line | manual | to remote laboratory | automated/ manual |
| at-line | discontinuous manual | to local analytical instrument | automated/ manual |
| on-line | automated | integrated | automated |
| in-line | integrated | no transport | automated |
| noninvasive | no contact | no transport | automated |

The disadvantages of process analyzers may be circumvented by a model-based methodology based on so-called soft sensors (virtual sensors). Soft sensors make use of continuously determined measured data of operating parameters that are essential to the operation of the process (for example temperatures, pressures, volume flows, fill levels, power outputs, mass flows, valve positions etc.). This makes it possible for example to predict concentrations of main products and byproducts.

Soft sensors are based on mathematical equations and are dependency simulations of representative measured values to a target value. In other words soft sensors show dependencies of correlating measured values and lead to a target parameter. The target parameter is thus not measured directly but rather is determined by use of these correlating measured values. Applied to the HC this means that for example the TCS content or the TCS selectivity are not determined with real measurement sensors (for example a process gas chromatograph) but rather may be calculated via correlations between operating parameters.

Mathematical equations for soft sensors may be obtained by fully empirical modeling (for example based on a transformed power law model) by semi-empirical modeling (for example based on kinetic equations for describing the reaction rate) or by fundamental modeling (for example based on fundamental equations of flow mechanics and kinetics). The mathematical equations may be derived using process simulation programs (for example OpenFOAM, ANSYS or Barracuda) or regression programs (for example Excel VBA, MATLAB or Maple).

FIG. 1 provides a schematic graphical illustration showing an advantageous operating range for the hydrochlorination when the ranges for K1, K2 (K2uncat or K2cat) and K3 are plotted in a Cartesian coordinate system (left side). Where the ranges for K1, K2 (K2uncat or K2cat) and K3 span a three-dimensional space (right side).

Figure 2:
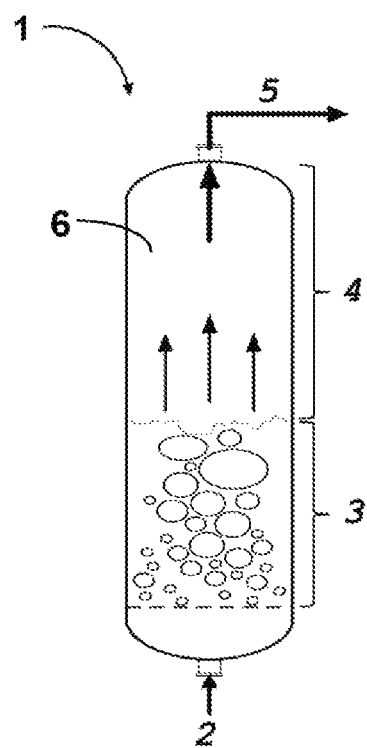

FIG. 2 provides a schematic illustration of a fluidized bed reactor for performing the HC process.

The present disclosure has for its object to improve the economy of the production of chlorosilanes by HC.

This object is achieved by a process for producing chlorosilanes according to reaction (1) in an interior fluidized bed reactor by reaction of an HCl-containing reaction gas with a particulate contact mass containing silicon and optionally a catalyst, wherein the chlorosilanes have the general formula $H_nSiCl_{4-n}$ and/or $H_mCl_{6-m}Si_2$ where n=1 to 4 and m=0 to 4.

The reactor design is described by a dimensionless index K1, wherein $$K1 = \varphi \cdot \frac{V_{reactor,\ eff}}{A_{tot,\ cooled} \cdot d_{hyd}}, \quad \text{(equation 1)}$$

where
 φ=fill level of the reactor,
 $V_{reactor,\ eff}$=effective volume of the reactor interior [m³],
 $A_{tot,\ cooled}$=sum of cooled surface areas in the reactor [m²] and
 $d_{hyd}$=hydraulic reactor diameter [m].

The constitution of the contact mass without the presence of a catalyst is described by a dimensionless index $K2_{uncat}$, wherein $$K2_{uncat} = R_{Si} \cdot \frac{B_{AK}}{d_{32}}, \quad \text{(equation 4)}$$

where
 $B_{AK}$=breadth of the particle size distribution of the contact mass [µm],
 $d_{32}$=particle Sauter diameter [µm] and
 $R_{Si}$=purity of the silicon.

The constitution of the contact mass in the presence of a catalyst is described by a dimensionless index $K2_{kat}$, wherein $$K2_{cat} = \frac{\delta_{rel}}{R_{Si}}, \quad \text{(equation 6)}$$

where
 $\delta_{rel}$=relative catalyst distribution in the contact mass.

The reaction conditions are described by a dimensionless index K3, wherein $$K3 = \frac{u_L}{v_F \cdot 10^6} \cdot \frac{p_{diff}}{g} \cdot \frac{1}{\rho_F}, \quad \text{(equation 8)}$$

where
 $u_L$=superficial gas velocity [m/s],
 $v_F$=kinematic viscosity of the fluid (gaseous reaction mixture in reactor interior) [m²/s],
 $\rho_F$=fluid density [kg/m³] and
 $p_{diff}$=pressure drop over fluidized bed [kg/m*s²].

In the process K1 is given a value of 1 to 10, $K2_{uncat}$ has a value of 0.1 to 10, $K2_{cat}$ has a value of 0.005 to 3 and K3 has a value of 1 to 700. Within these ranges the productivity of the process is particularly high.

The use of physical and virtual methods of process monitoring made it possible to identify new correlations in the HC which make it possible to describe the HC via the three indices K1, K2 ($K2_{uncat}$ or $K2_{cat}$) and K3 in such a way that the process is operable in particularly economic fashion through the choice of certain parameter settings and combinations thereof. The process according to the present disclosure allows for integrated, predictive process control in the context of "Advanced Process Control (APC)" for the HC. If the HC is performed in the inventive ranges for K1, K2 ($K2_{uncat}$ or $K2_{cat}$) and K3, especially via process control systems (preferably APC controllers), the highest possible economic efficiency is achieved. In an integrated system for production of silicon products (for example polysilicon of various quality grades) integration of the process allows the production sequence to be optimized and production costs to be reduced.

When plotted in a Cartesian coordinate system the ranges for the indices K1, K2 ($K2_{uncat}$ or $K2_{cat}$) and K3 span a three-dimensional space which represents a particularly advantageous operating range for the HC. Such an operating range is shown schematically in FIG. 1. The process according to the presend disclosure especially also simplifies the configuration of new fluidized bed reactors for the HC.

Soft sensors additionally allow performance parameters such as for example TCS selectivity to be shown as a function of K1, K2 (K2$_{uncat}$ or K2$_{cat}$) and K3. The performance data thus determined in high temporal resolution can be provided to a process control device, in particular a model-predictive control device, as a manipulated variable, thus allowing the process to be operated in economically optimized fashion.

In a preferred embodiment of the process K1 has a value of 1.2 to 9, preferably of 1.3 to 7, particularly preferably of 1.5 to 5.5.

K2$_{uncat}$ by preference has a value of 0.5 to 8, preferably of 0.75 to 6, particularly preferably of 1 to 5.

K2$_{cat}$ by preference has a value of 0.0075 to 2, preferably of 0.009 to 1, particularly preferably of 0.01 to 0.5.

K3 by preference has a value of 1.5 to 600, preferably of 2 to 450, particularly preferably of 3 to 300.

FIG. 2 shows schematically a fluidized bed reactor 1 having a reactor interior 6 for performing the process. The reaction gas 2 is injected into the particulate contact mass preferably from below and optionally from the side (for example tangentially or orthogonally to the gas stream from below), thus fluidizing the particles of the contact mass to form a fluidized bed 3. The reaction is generally initiated by heating the fluidized bed 3 using a heating apparatus (not shown) arranged externally to the reactor. Heating is typically not required during continuous operation. A portion of the particles is transported from the fluidized bed 3 into the empty space 4 above the fluidized bed 3 by the gas flow. The free space 4 is characterized by a very low solids density and said density decreases in the direction of the reactor outlet. The particle fraction which exits the reactor with the gas flow is described as particle discharge 5. An example of a fluidized bed reactor is described in U.S. Pat. No. 4,092,446.

K1—the Fill Level-Weighted Reactor Design

The index K1 relates via equation 1 parameters of reactor geometry, namely the effective volume of the reactor interior $V_{Reactor, eff}$, the sum of the cooled surface areas in the reactor interior $A_{tot, cooled}$ and the hydraulic diameter $d_{hyd}$, to the fluidized bed as expressed by the dimensionless fill level cp.

$V_{Reactor, eff}$ corresponds to the total volume of the reactor interior minus the volume of all internals. $V_{Reactor, eff}$ is by preference 1 to 60 m$^3$, preferably 3 to 40 m$^3$, particularly preferably 4 to 30 m$^3$.

Fluid dynamics investigations in fluidized bed reactors have shown that the geometry of the interior of the fluidized bed reactor can have a decisive effect on fluid dynamics and thus also on productivity. Interior is to be understood as meaning in particular the region that may come into contact with the reaction gas and/or the particles of the contact mass (i.e. for example both the empty space and the region in which the fluidized bed is formed). The geometry of the interior is determined not only by general constructional features such as height, width, shape (for example cylinder or cone) but also by internals arranged in the interior. The internals may be in particular heat exchanger units, stiffening planes, feeds (conduits) for introducing the reaction gas and apparatuses for distributing the reaction gas (for example gas distributor plates).

The sum of the cooled surface areas in the reactor interior $A_{tot, cooled}$ specifies how much surface area can be utilized for targeted heat exchange. For example $A_{tot, cooled}$ is made up of the surface areas of a cooling matrix (consisting of individual lances, u-pipes or the like) and a jacket cooler.

The hydraulic diameter $d_{hyd}$ of the fluidized bed reactor is an engineering index which makes it possible to describe fluid-mechanical friction and surface effects of internals, channels or other geometries by attributing these to an equivalent diameter. $d_{hyd}$ is calculated according to equation 2.

$$d_{hyd} = 4 \cdot \frac{A_{q, free}}{U_{tot, wetted}}, \qquad \text{(equation 2)}$$

where
$A_{q, free}$=free flow cross section in interior [m$^2$] and
$U_{tot, wetted}$=wetted perimeter of all internals [m].

The free flow cross section is the cross section of the portion of the reactor (without internals) in which the fluidized bed is formed.

The hydraulic plant diameter $d_{hyd}$ is by preference 0.7 to 1.8 m, preferably 0.8 to 1.7 m, particularly preferably 0.9 to 1.6 m.

The measurement of all objects (diameter of the interior, perimeter of internals, cooled surface areas) may be determined for example by laser measurements/3-D scans (for example ZEISS COMET L3D 2). Such dimensions can typically also be discerned from the reactor manufacturer's literature or with reference to design drawings.

The fill level φ indicates how much contact mass is present in the reactor interior. φ is calculated according to equation 3.

$$\varphi = 10 \cdot \frac{p_{diff}}{\rho_p \cdot g}, \qquad \text{(equation 3)}$$

where
$p_{diff}$=pressure drop over the fluidized bed [kg/m*s$^2$],
$\rho_p$=particle solids density of contact mass [kg/m$^3$] and
g=acceleration due to gravity [m/s$^2$].

The particle solids density $\rho_p$ may be regarded as approximately constant. A typical value is 2336 kg/m$^3$ for example (density of Si at 20° C.). Measurement may be carried out with a pycnometer.

The pressure drop over the fluidized bed $p_{diff}$ is preferably 10 000 to 400 000 kg/m*s$^2$, particularly preferably 20 000 to 100 000 kg/m*s$^2$, in particular 30 000 to 80 000 kg/m*s$^2$. To determine $p_{diff}$ the pressure is measured both in a feed conduit for the reaction gas and in a discharge conduit for the offgas for example with a manometer. $p_{diff}$ is the difference.

K2$_{uncat}$ and K2$_{cat}$—the Constitution of the Contact Mass

K2$_{uncat}$ and K2$_{cat}$ describe via equations 4 and 6 the constitution, in particular the granulation, of the employed particulate contact mass.

K2$_{uncat}$ is used for the noncatalytic variant of the HC. It is made up of the dimensionless purity of the silicon R$_{Si}$, the breadth of the particle size distribution of the contact mass B$_{AK}$ and the Sauter diameter d$_{32}$. B$_{AK}$ is derived according to equation 5.

$$B_{AK} = d_{90} - d_{10}, \text{ wherein} \qquad \text{(equation 5)}$$

d$_{10}$ [μm] is a measure for the size of the relatively small particles and the value d$_{90}$ [μm] is a measure for the relatively large particles in the fraction or granulation mixture. d$_{10}$ and d$_{90}$ are generally important parameters for the characterization of a particle size distribution. For example, the value $d_{10}$ means that 10% of all particles are smaller than the recited value. The value $d_{50}$ is moreover defined as the median particle size (cf. DIN 13320).

The values for $d_{10}$ and $d_{90}$ are preferably chosen such that a breadth of the particle size distribution of the contact mass $B_{AK}$ of 10 to 1500 µm, particularly preferably of 100 to 1000 µm, in particular of 300 to 800 µm, is obtained.

The Sauter diameter $d_{32}$ is the mean, equal-volume particle diameter of the contact mass and is preferably 10 to 1000 µm, particularly preferably 50 to 800 µm, in particular 100 to 500 µm.

Determination of the breadth of the particle size distribution/of the Sauter diameter may be carried out according to ISO 13320 (laser diffraction) and/or ISO 13322 (image analysis). Calculation of average particle sizes/diameters from particle size distributions may be carried out according to DIN ISO 9276-2.

$K2_{cat}$ is used for the catalytic variant of the HC. It is the ratio of the purity of the silicon of the employed contact mass $R_{Si}$ and the relative catalyst distribution in the contact mass $\delta_{rel}$ according to equation 6.

The term catalyst distribution is to be understood as also encompassing mixtures of catalysts and/or promoters that may be added to the fluidized bed reactor. The relative catalyst distribution in the contact mass is a measure for the wetting/general wettability of the particulate contact mass with the catalyst, the catalyst mixture or the catalyst-promoter mixture.

$\delta_{rel}$ may be calculated according to equation 7.

$$\delta_{rel} = \lambda \cdot \frac{O_{spec, cat}}{O_{spec, SiK}}, \quad \text{(equation 7)}$$

where
$\lambda$=mass ratio of catalyst/silicon granulation or catalyst loading,
$O_{spec, cat}$=average specific surface area of the catalyst [m²/kg] and
$O_{spec, SiK}$=average specific surface area of the silicon granulation [m²/kg].

The relative catalyst distribution in the contact mass $\delta_{rel}$ is by preference 0.005 to 3, preferably 0.009 to 2, particularly preferably 0.01 to 0.5.

The average specific area may for example be determined directly by gas adsorption according to the BET method (ISO 9277).

A "granulation" is in particular to be understood as meaning a mixture of silicon particles obtainable for example by comminution of chunk silicon, in particular $S_{img}$, by using crushing and milling plants. The chunk silicon may have an average particle size of >10 mm, preferably >20 mm, particularly preferably >50 mm. The maximum average particle size is preferably 500 mm.

Granulations may be classified into fractions essentially by sieving and/or sifting.

Granulations are producible by/from
  crushing and milling of chunk silicon; subsequent optional sieving and/or sifting (classifying)
  wastes, in particular in the form of dusts, generated in the processing (crushing, milling, sawing) of various silicon types (wafers, polycrystalline/multicrystalline/single-crystal Silicium, $Si_{mg}$) and may be classified and/or processed (z.B. compacting/agglomerating, for example in the form of pellets); in the form of oversize and/or undersize, wherein these are fractions which are outside the target particle size,
  processes for producing granulated $Si_{mg}$ or polysilicon and co-generated material thus formed, in particular silicon dusts (average particle diameter <10 µm, optionally processed (compacting/agglomerating), for example in the form of pellets).

A mixture of different granulations may be referred to as a granulation mixture and the granulations of which the granulation mixture consists may be referred to as granulation fractions. Granulation fractions may be categorized relative to one another into coarse grain fractions and fine grain fractions. More than one granulation fraction may in principle be categorized as a coarse grain fraction and/or a fine grain fraction in the case of a granulation mixture. The granulation introduced into the fluidized bed reactor may be referred to as the operating granulation. The contact mass is generally the granulation mixture which is brought into contact and reacts with the reaction gas in the reactor.

The contact mass is in particular a granulation mixture. The contact mass preferably comprises no further components. It is preferably silicon containing not more than 5% by weight, particularly preferably not more than 2% by weight, in particular not more than 1% by weight, of other elements as impurities. It is preferably $Si_{mg}$ which typically has a purity of 98% to 99.9%. A typical composition comprises for example 98% silicon, wherein the remaining 2% are generally largely composed of the elements: Fe, Ca, Al, Ti, Cu, Mn, Cr, V, Ni, Mg, B, C, P and O. Further elements that may be present include Co, W, Mo, As, Sb, Bi, S, Se, Te, Zr, Ge, Sn, Pb, Zn, Cd, Sr, Ba, Y and Cl. The specified purity of silicon is accordingly to be understood such that in the silicon sample to be measured the content of the recited elements is determined and the sum of these is then used to calculate the purity (for example in % by weight). If a total content of impurities of 2% by weight is determined this equates to a silicon content of 98% by weight. The use of silicon having a lower purity of 75% to 98% by weight is also possible. However the silicon content is by preference greater than 75% by weight, preferably greater than 85% by weight, particularly preferably greater than 95% by weight.

A number of the elements present in the silicon as impurities exhibit catalytic activity. Therefore the addition of a catalyst is in principle not necessary. However, the process may be positively influenced, in particular in respect of its selectivity, by the presence of one or more additional catalysts.

In one embodiment the employed silicon is a mixture of $Si_{mg}$ and ultrahigh purity silicon (purity >99.9%). In other words a granulation mixture comprising $Si_{mg}$ and ultrahigh purity silicon is concerned. The proportion of $Si_{mg}$ is by preference at least 50% by weight, preferably at least 70% by weight, particularly preferably at least 90% by weight, based on the total weight of the granulation mixture. The ultrahigh purity silicon is in particular a constituent of the fine grain fraction. The fine grain fraction may furthermore contain exclusively ultrahigh purity silicon.

In a further embodiment the employed silicon is $Si_{mg}$ and ultrahigh purity silicon, wherein the proportion of $Si_{mg}$ is less than 50% by weight based on the total weight of the granulation mixture. The granulation mixture/the contact mass additionally comprises a catalyst. The ultrahigh purity silicon and/or the catalyst are preferably constituents of the fine grain fraction. The fine grain fraction preferably consists of ultrahigh purity silicon.

In another embodiment the employed silicon is exclusively ultrahigh purity silicon and the contact mass/granulation mixture contains a catalyst.

Ultrahigh purity silicon may in principle be converted by HC just in the presence of small amounts of one of the elements Co, Mo and W (generally already present in the ultrahigh purity silicon as an impurity). A combined conversion with $Si_{mg}$ which contains relatively large amounts of the catalytically active elements as impurities is not absolutely necessary. However, the chlorosilane selectivity may be increased further by addition of a catalyst. In the present process this may be the case in particular when the proportion of ultrahigh purity silicon in the granulation mixture is greater than the proportion of $Si_{mg}$ and/or when the granulation mixture comprises exclusively ultrahigh purity silicon.

The catalyst may be one or more elements from the group comprising Fe, Cr, Ni, Co, Mn, W, Mo, V, P, As, Sb, Bi, O, S, Se, Te, Ti, Zr, C, Ge, Sn, Pb, Cu, Zn, Cd, Mg, Ca, Sr, Ba, B, Al, Y, Cl. The catalyst is preferably selected from the group comprising Fe, Al, Ca, Ni, Mn, Cu, Zn, Sn, C, V, Ti, Cr, B, P, O, Cl and mixtures thereof. As mentioned hereinabove these catalytically active elements may already be present in silicon in a certain proportion as an impurity, for example in oxidic or metallic form, as silicides or in other metallurgical phases or as oxides or chlorides. The proportion thereof depends on the purity of the silicon employed.

The catalyst may be added to the contact mass for example in metallic, alloyed and/or salt-like form. Chlorides and/or oxides of the catalytically active elements in particular may be concerned. Preferred compounds are CuCl, $CuCl_2$, CuP, CuO or mixtures thereof. The contact mass may further contain promoters, for example Zn and/or $ZnCl_2$ and/or Sn.

The elemental composition of the employed silicon and of the contact mass may be determined for example by x-ray fluorescence analysis.

Based on silicon the catalyst is preferably present in a proportion of 0.1% to 20% by weight, particularly preferably of 0.5% to 15% by weight, in particular of 0.8% to 10% by weight, especially preferably of 1% to 5% by weight K3—Reaction Conditions The index K3 relates to one another via equation 8 the most important parameters of the HC. Contained therein are the superficial gas velocity $u_L$, the pressure drop over the fluidized bed $p_{diff}$, the kinematic viscosity of the fluid $v_F$ and the fluid density $\rho_F$. Fluid is to be understood as meaning the gaseous reaction mixture in the reactor interior.

The superficial gas velocity $u_L$ is by preference 0.05 to 4 m/s, preferably 0.06 to 2 m/s, particularly preferably 0.1 to 1 m/s, in particular 0.15 to 0.55 m/s.

The fluid density $\rho_F$ and the kinematic viscosity $v_F$ may be determined by simulations of phase equilibrium states using process engineering software. These simulations are typically based on adapted phase equilibria which for varying physical parameters (for example p and T) draw on actually measured compositions of the reaction mixture both in the gas phase and in the liquid phase. This simulation model may be validated using actual operating states/parameters and thus allows specification of operating optima in respect of the parameters $\rho_F$ and $v_F$.

Determination of the phase equilibria may be carried out using a measurement apparatus for example (for example modified Rock and Sieg recirculation apparatus, for example MSK Baraton Typ 690, MSK Instruments). Variation of physical influencing variables such as pressure and temperature bring about changes of state for a substance mixture. The different states are subsequently analyzed and the component composition is determined, for example with a gas chromatograph. Computer-aided modeling can be used to adapt equations of state to describe phase equilibria. The data are transferred into the process engineering software programs so that phase equilibria can be calculated.

Kinematic viscosity is a measure of momentum transfer perpendicular to the flow direction in a moving fluid. The kinematic viscosity $v_F$ may be described via dynamic viscosity and fluid density. Density may be approximated for example via the Rackett equation for liquids and via an equation of state, for example Peng-Robinson, for gases. Measurement of density may be carried out with a digital density measuring instrument (for example DMA 58, Anton Paar) using the torsion pendulum method (eigenfrequency measurement).

The fluid density $\rho_F$ is preferably in a range from 1.5 to 5 $kg/m^3$. The kinematic viscosity $v_F$ is preferably in a range from $3 \cdot 10^{-6}$ to $2.5 \cdot 10^{-5}$ $m^2/s$.

The absolute pressure in the fluidized bed reactor at which the process according to the present disclosure is preferably performed is 0.1 to 1 MPa, particularly preferably 0.13 to 0.7 MPa, in particular 0.15 to 0.5 MPa.

The process is preferably performed in a temperature range from 280° C. to 400° C., particularly preferably from 300° C. to 380° C., in particular from 320° C. to 360° C.

The reaction gas preferably contains at least 50 vol %, particularly preferably at least 70 vol %, in particular at least 90 vol %, of HCl. In addition to HCl the reaction gas may further contain one or more components selected from the group comprising $H_2$, $H_nSiCl_{4-n}$ (n=0-4), $H_mCl_{6-n}Si_2$ (m=0-6), $H_qCl_{6-q}Si_2O$ (q=0-4), $CH_4$, $C_2H_6$, CO, $CO_2$, $O_2$, $N_2$. These components may derive from HCl recovered in an integrated system for example.

The reaction gas may further contain a carrier gas, for example nitrogen or a noble gas such as argon.

It is further possible to add hydrogen to the reaction gas, in particular to influence the equilibrium position of the reaction. Hydrogen may also be present in recovered HCl as an impurity.

Determination of the composition of the reaction gas is typically carried out before supplying to the reactor via Raman and infrared spectroscopy and also gas chromatography. This may be carried out either via samples withdrawn in the manner of spot checks and subsequent "offline analyses" or else via "online" analytical instruments integrated into the system.

The process is preferably integrated into an integrated system for production of polysilicon. The integrated system preferably comprises the following processes: production of TCS by the process according to the present disclosure, purification of the produced TCS to afford semiconductor-quality TCS, deposition of polysilicon, preferably by the Siemens process or as a granulate.

EXAMPLES

In order to apply the findings and correlations to productivity in the production of chlorosilanes and to define the ranges for the indices K1, K2 ($K2_{uncat}$ or $K2_{cat}$) and K3 (operating ranges) detailed investigations on continuously operated fluidized bed reactors of different sizes were performed.

Various experiments V were performed (Table 1: V1 to V28 for uncatalyzed HC and Table 2: V1 to V16 for catalyzed HC), wherein varied in each case were the hydraulic plant diameter $d_{hyd}$ with values from 0.7 m to 1.8 m, the superficial gas velocity $u_L$ with values from 0.05 m/s to 4 m/s, the particle Sauter diameter $d_{32}$ with values from 5 μm to 1000 μm, the breadth of the operating granulation $B_{AK}$ with values from 10 to 1500 μm and the relative catalyst distribution over the contact mass $\delta_{rel}$ with values of 0.005 to 3, the purity with values of 0.75 to 0.9999, the catalyst loading A with values of 0.001 to 0.1 and the pressure drop over the fluidized bed $p_{diff}$ with values of 5000 to 400 000 kg/m*s².

The particle solids density $\rho_P$ may be assumed to be approximately constant. The fluid density $\rho_F$ is typically in a range from 1.5 to 5 kg/m³. The kinematic viscosity $v_F$ is typically in a range from $3*10^{-6}$ to $2.5*10^{-5}$ m²/s.

In the catalyzed variant only two optimized cases of combinations of K1 and K3 were reported to elucidate the effect of $K2_{cat}$. The indices K1, $K2_{uncat}$, $K2_{cat}$ and K3 resulted from the chosen parameters. The productivity [kg/(kg*h)], i.e. the produced amount of chlorosilanes per hour [kg/h] based on the amount of operating granulation employed in the reactor [kg], was used as a basis for evaluation of the selected combinations K1, $K2_{uncat}$, $K2_{cat}$ and K3 and for definition of the optimal ranges. A productivity of >0.01 kg/(kg*h) is considered optimal/acceptable for both variants.

TABLE 1

| Experiment | K1 | $K2_{uncat}$ | K3 | Productivity [kg/(kg*h)] |
|---|---|---|---|---|
| V1 | 0.84 | 2.61 | 4.08 | <0.01 |
| V2 | 2.94 | 1.64 | 7.61 | 0.225 |
| V3 | 3.46 | 1.90 | 7.25 | 0.287 |
| V4 | 1.37 | 2.16 | 6.80 | 0.087 |
| V5 | 5.54 | 0.32 | 10.87 | 0.137 |
| V6 | 3.92 | 2.24 | 0.78 | <0.01 |
| V7 | 2.68 | 2.33 | 31.80 | 0.331 |
| V8 | 3.92 | 2.24 | 39.14 | 0.360 |
| V9 | 2.40 | 12.28 | 71.36 | <0.01 |
| V10 | 2.95 | 3.28 | 75.14 | 0.501 |
| V11 | 3.43 | 3.01 | 43.96 | 0.293 |
| V12 | 4.33 | 1.90 | 40.77 | 0.420 |
| V13 | 3.27 | 1.71 | 18.12 | 0.344 |
| V14 | 5.62 | 0.19 | 10.87 | 0.021 |
| V15 | 4.50 | 5.14 | 96.11 | 0.444 |
| V16 | 4.06 | 5.78 | 84.46 | 0.627 |
| V17 | 5.10 | 5.36 | 103.10 | 0.534 |
| V18 | 4.80 | 6.93 | 178.39 | 0.112 |
| V19 | 5.07 | 4.46 | 180.57 | 0.216 |
| V20 | 4.55 | 3.82 | 441.73 | 0.199 |
| V21 | 2.40 | 0.0098 | 408 | <0.01 |
| V22 | 3.93 | 9.90 | 271.83 | 0.034 |
| V23 | 8.90 | 2.72 | 58.10 | 0.103 |
| V24 | 6.06 | 3.54 | 475.71 | 0.091 |
| V25 | 14.50 | 2.33 | 679.58 | <0.01 |
| V26 | 6.76 | 2.48 | 509.68 | 0.075 |
| V27 | 8.31 | 2.97 | 611.62 | 0.029 |
| V28 | 3.92 | 2.24 | 783 | <0.01 |

TABLE 2

| Experiment | K1 | $K2_{cat}$ | K3 | Productivity |
|---|---|---|---|---|
| V1 | 3.46 | 0.013 | 58.2 | 0.422 |
| V2 | 3.46 | 0.369 | 58.2 | 0.473 |
| V3 | 3.46 | 0.467 | 58.2 | 0.299 |
| V4 | 3.46 | 0.876 | 58.2 | 0.232 |
| V5 | 3.46 | 2.336 | 58.2 | 0.086 |
| V6 | 3.46 | 2.947 | 58.2 | 0.017 |
| V7 | 3.46 | 0.004 | 58.2 | <0.01 |
| V8 | 3.46 | 4.505 | 58.2 | <0.01 |
| V9 | 6.06 | 0.013 | 152.9 | 0.507 |
| V10 | 6.06 | 0.369 | 152.9 | 0.511 |
| V11 | 6.06 | 0.467 | 152.9 | 0.320 |
| V12 | 6.06 | 0.876 | 152.9 | 0.245 |
| V13 | 6.06 | 2.336 | 152.9 | 0.091 |
| V14 | 6.06 | 2.947 | 152.9 | 0.019 |
| V15 | 6.06 | 0.004 | 152.9 | <0.01 |
| V16 | 6.06 | 4.505 | 152.9 | <0.01 |

The experiments demonstrate that for both variants of the HC chlorosilanes are producible with particularly high productivity when the process is performed in the optimal ranges of the indices K1, $K2_{uncat}$, $K2_{cat}$ and K3.

The invention claimed is:

1. A process for producing chlorosilanes in a fluidized bed reactor, comprising:
   reacting a hydrogen chloride-containing reaction gas with a particulate contact mass containing silicon and optionally a catalyst, wherein the chlorosilanes have the general formula $H_nSiCl_{4-n}$ and/or $H_mCl_{6-m}Si_2$ where n=1-3 and m=0-4, and
   wherein the reactor design is described by an index $$K1 = \varphi \cdot \frac{V_{reactor,\ eff}}{A_{tot,\ cooled} \cdot d_{hyd}}$$

wherein $\varphi$ is a fill level of the reactor;
   wherein $V_{reactor,\ eff}$ is an effective volume of the reactor [m³];
   wherein $A_{tot,\ cooled}$ is a sum of cooled surface areas in the reactor [m²];
   wherein $d_{hyd}$ is a reactor diameter [m]; and
   wherein $V_{reactor,\ eff}$=1 to 60 m³ and $d_{hyd}$=0.7 to 1.8 m;
   wherein the constitution of the contact mass without the catalyst is described by an index $$K2_{uncat} = R_{Si} \cdot \frac{B_{AK}}{d_{32}}$$

wherein $B_{AK}$ is a breadth of the particle size distribution of the contact mass [μm];
   wherein $d_{32}$ is a particle Sauter diameter [μm];
   wherein $R_{Si}$ is a purity of the silicon; and
   wherein $B_{AK}$ is 10 to 1500 μm and $d_{32}$ is 10 to 1000 μm;
   wherein the constitution of the contact mass with catalyst is described by an index $$K2_{cat} = \frac{\delta_{rel}}{R_{Si}};$$

wherein $\delta_{rel}$ is a relative catalyst distribution in the contact mass;
   wherein $\delta_{rel}$ is 0.005 to 3; and
   wherein $R_{Si}$ is 0.75 to 0.9999;
   wherein the reaction conditions are described by an index $$K3 = \frac{u_L}{v_F \cdot 10^6} \cdot \frac{p_{diff}}{g} \cdot \frac{1}{\rho_F}$$

wherein $u_L$ is a superficial gas velocity [m/s] of the gaseous reaction mixture in an interior of the reactor;

wherein $v_F$ is a kinematic viscosity [m²/s] of gaseous reaction mixture measured at the temperature in the interior of the reactor;

wherein $\rho_F$ is a density [kg/m³] of the gaseous reaction mixture in the portion of the reactor in which the fluidized bed is formed;

wherein $p_{diff}$ is a pressure drop over fluidized bed [kg/m*s²]; and wherein $u_L$ is 0.05 to 4 m/s, $v_F$ is 3*10-6 to 2/5*10-5 m²/s, $\rho_F$ is 1.5 to 5 kg/m³ and $p_{diff}$ is 10 000 to 400 000 kg/m*s²;

wherein K1 has a value of 1 to 10, wherein $K2_{uncat}$ has a value of 0.1 to 10 or wherein $K2_{cat}$ has a value of 0.005 to 3; and wherein K3 has a value of 1 to 700.

2. The process of claim 1, wherein K1 has a value of 1.2 to 9.

3. The process of claim 1, wherein $K2_{uncat}$ has a value of 0.5 to 8.

4. The process of claim 1, wherein $K2_{cat}$ has a value of 0.0075 to 2.

5. The process of claim 1, wherein K3 has a value of 1.5 to 600.

6. The process of claim 1, wherein the effective reactor volume $V_{Reactor, eff}$ is 3 to 40 m³.

7. The process of claim 1, wherein the hydraulic plant diameter $d_{hyd}$ is 0.8 to 1.7 m.

8. The process of claim 1, wherein the pressure drop over the fluidized bed reactor $p_{diff}$ is 20,000 to 100,000 kg/m*s².

9. The process of claim 1, wherein the particle Sauter diameter $d_{32}$ is 50 to 800 µm.

10. The process of claim 1, wherein the breadth of the particle size distribution of the contact mass $B_{AK}$ is 100 to 1000 µm.

11. The process of claim 1, wherein the relative catalyst distribution in the contact mass $\delta_{rel}$ is 0.009 to 2.

12. The process of claim 1, wherein the superficial gas velocity $u_L$ is 0.06 to 2 m/s.

13. The process of claim 1, wherein the absolute pressure in the fluidized bed reactor is 0.1 to 1 MPa.

14. The process of claim 1, wherein the reaction is performed in a temperature range of 280° C. to 380° C.

15. The process of claim 1, wherein the fluidized bed reactor is integrated into an integrated system for production of polycrystalline silicon.

16. The process of claim 1, wherein the relative catalyst distribution in the contact mass $\delta_{rel}$ is described by an index $$\delta_{rel} = \lambda \cdot \frac{O_{spec,cat}}{O_{spec,SiK}};$$

wherein $\lambda$ is a mass ratio of catalyst/silicon granulation or catalyst loading;

wherein $O_{spec, cat}$ is an average specific surface area of the catalyst determined according to BET method [m²/kg]; and wherein $O_{spec, SiK}$ is an average specific surface area of the silicon granulation determined according to BET method [m²/kg].

17. The process of claim 1, wherein the reactor diameter $d_{hyd}$ is described by an index $$d_{hyd} = 4 \cdot \frac{A_{q,free}}{U_{tot,wetted}};$$

wherein $A_{q,free}$ is a free flow cross section area of the portion of the reactor in which the fluidized bed is formed in interior [m²]; and wherein $U_{tot, wetted}$ is a wetted perimeter of all internals [m].

* * * * *